(12) United States Patent
Tober et al.

(10) Patent No.: US 8,532,897 B2
(45) Date of Patent: Sep. 10, 2013

(54) CONTROLLER AND METHOD FOR DETECTING VEHICLE PULL

(75) Inventors: Michael D. Tober, Bay Village, OH (US); Kenneth A. Grolle, Elyria, OH (US); Eric A. Matoy, Orion, MI (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 45 days.

(21) Appl. No.: 13/326,711

(22) Filed: Dec. 15, 2011

(65) Prior Publication Data

US 2013/0158801 A1 Jun. 20, 2013

(51) Int. Cl.
*B60T 8/1755* (2006.01)

(52) U.S. Cl.
USPC .............. 701/70; 303/121; 303/146; 701/79

(58) Field of Classification Search
USPC ................. 701/36, 29.1, 70, 79; 303/146–7, 303/155, 121–122
See application file for complete search history.

(56) References Cited

U.S. PATENT DOCUMENTS

| 3,988,043 | A | * | 10/1976 | Reinecke ...................... 303/160 |
| 5,713,642 | A | * | 2/1998 | Okazaki ....................... 303/121 |
| 5,752,751 | A | | 5/1998 | Nakaura |
| 6,092,879 | A | | 7/2000 | Kornhaas |
| 6,923,510 | B2 | | 8/2005 | Hac |
| 7,013,209 | B2 | | 3/2006 | Zumberge |
| 7,245,995 | B2 | | 7/2007 | Kueperkoch |
| 2002/0109403 | A1 | | 8/2002 | Yamamoto |
| 2004/0068555 | A1 | * | 4/2004 | Satou ............................ 709/219 |
| 2008/0172163 | A1 | * | 7/2008 | Englert et al. .................. 701/83 |

* cited by examiner

*Primary Examiner* — Yonel Beaulieu
(74) *Attorney, Agent, or Firm* — Eugene E. Clair; Cheryl L. Greenly

(57) ABSTRACT

Various embodiments of a controller for a vehicle braking system capable of determining vehicle pull during automated braking, are disclosed. The controller comprises a yaw rate input for receiving a yaw rate signal indicative of a yaw rate of the vehicle; a stability input for receiving a stability signal from a stability sensor of the vehicle; a deceleration input for receiving a deceleration signal indicative of an automated deceleration request and a brake output for transmitting a brake control signal. The controller includes control logic to determine vehicle pull based on the yaw rate signal and the stability signal.

25 Claims, 3 Drawing Sheets ered by the automated braking system controller when the ACC or CMT system determines that the truck or tractor is advancing too closely to a target vehicle. The braking system controller can respond to the automated deceleration request by automatically applying all of the wheel end brakes on the truck or tractor simultaneously. Therefore, when a wheel end modulator fails to exhaust air, the wheel end modulator will maintain or increase the brake pressure when automated braking is engaged. The wheel end modulator may also fail to hold air during automated braking. In the situation described above, the truck or tractor can be pulled out of the desired travel path due to different pressures at each wheel end, causing instability.

CONTROLLER AND METHOD FOR DETECTING VEHICLE PULL

BACKGROUND

The present invention relates to embodiments of a vehicle controller that controls the brakes and a method for detecting vehicle movement during braking. More specifically, embodiments of a vehicle controller and a method for detecting a commercial truck or tractor vehicle being pulled out of the desired travel path are disclosed.

Trucks or tractors can be equipped with one or more automated braking systems, for example, an antilock braking system (ABS), an automatic slip reduction system (ASR), a roll stability control system (RSC) and/or an electronic stability control system (ESC) in order to stabilize the vehicle in critical driving situations. By means of electro-pneumatic devices, such as modulators, controlled by the automated braking system, the brake pressures at each wheel end are individually controlled such that a locking or a spinning of the wheels is avoided and vehicle directional instability is mitigated.

If an individual modulator at any wheel end of the truck or tractor traps air at the wheel end during a braking cycle and fails to exhaust the air, the truck or tractor may be pulled in the direction of that wheel end. Some automated braking systems, such as Electronic Braking Systems (EBS) have pressure sensors at each wheel end, which can detect a brake pressure present at the wheel end and compare the actual brake pressure to a desired brake pressure. However, more common systems have no pressure sensor available at the wheel end to monitor the performance of the wheel end modulator.

Trucks or tractors may also be equipped with an automated cruise control system (ACC), such as the Bendix® Wingman® active cruise with braking system or a collision mitigation system (CMT), such as the Bendix® Wingman® Advanced™ collision mitigation technology. An automated deceleration request from the ACC or CMT system is received by the automated braking system controller when the ACC or CMT system determines that the truck or tractor is advancing too closely to a target vehicle. The braking system controller can respond to the automated deceleration request by automatically applying all of the wheel end brakes on the truck or tractor simultaneously. Therefore, when a wheel end modulator fails to exhaust air, the wheel end modulator will maintain or increase the brake pressure when automated braking is engaged. The wheel end modulator may also fail to hold air during automated braking. In the situation described above, the truck or tractor can be pulled out of the desired travel path due to different pressures at each wheel end, causing instability.

SUMMARY

Various embodiments of a controller for a vehicle braking system capable of detecting vehicle pull during automated braking are disclosed. The controller comprises a yaw rate input for receiving a yaw rate signal indicative of a yaw rate of the vehicle; a stability input for receiving a stability signal from a sensor of the vehicle; a deceleration input for receiving a deceleration signal indicative of an automated deceleration request and a brake output for transmitting a brake control signal. The controller includes control logic capable of: transmitting the brake control signal in response to the deceleration signal; determining a vehicle pull is occurring during the transmission of the brake control signal based on the stability signal and the yaw rate signal. The control logic is capable of suspending the transmission of the brake control signal based on the determination of vehicle pull.

Various methods for detecting vehicle pull during automated braking are also disclosed. The method comprises receiving a deceleration signal; initiating automated braking in response to the deceleration signal; receiving a signal indicative of a yaw rate of the vehicle; receiving a signal from a stability sensor of the vehicle, determining a reference yaw rate of the vehicle based on the stability signal and determining a vehicle pull situation is occurring during automated braking based on the reference yaw rate and the yaw rate signal.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
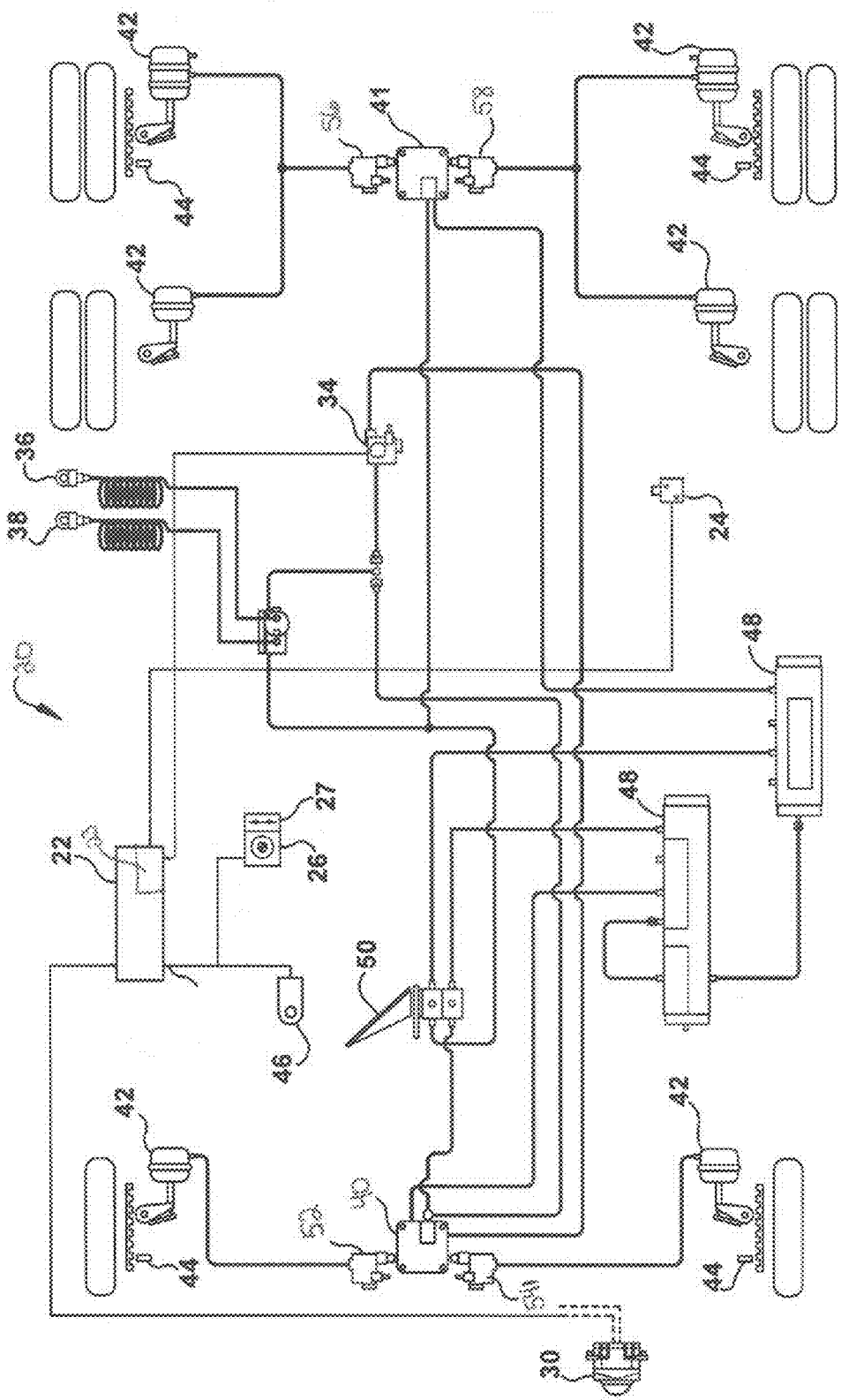
FIG. 1 illustrates a schematic representation of a braking system on a tractor including a vehicle controller, according to an embodiment of the present invention.

With reference to FIG. 1, a tractor air brake system 20 is shown. The system 20 includes a braking system controller 22 with inputs for electrically connecting to, either directly or through a vehicle serial communication bus, at least four wheel speed sensors 44, a steering angle sensor 46, a lateral acceleration sensor 26, a yaw rate sensor 27 and a load sensor 24. The braking system controller 22 includes outputs for electrically connecting to, either directly or through a vehicle serial communication bus, a right front modulator 52, a left front modulator 54, a right rear modulator 56, a left rear modulator 58, a front traction relay valve 40, a rear traction relay valve 41, and a trailer pressure control device 34. The mechanical portion of the tractor air brake system 20 includes at least four brake actuators 42, at least two reservoirs 48 and an operator actuated brake pedal 50. The right front modulator 52 is connected pneumatically to the front traction relay valve 40 and to a first one of the at least four brake actuators 42. The left front modulator 54 is connected pneumatically to the front traction relay valve 40 and to at least a second one of the at least four brake actuators 42. The right rear modulator 56 is connected pneumatically to the rear traction relay valve 41 and to a third one of at least one of the at least four brake actuators 42. The left rear modulator 58 is connected pneumatically to the rear traction relay valve 41 and to a fourth one of at least one of the at least four brake actuators 42. With this configuration, the braking system controller 22 can actuate the tractor brakes independently of the operator by sending a brake control signal to the modulators 52, 54, 56, 58 and the traction relay valves 40, 41 in order to maintain vehicle stability.

In one embodiment, the tractor air brake system 20 is pneumatically connected to a towing vehicle, or trailer, air brake system (not shown) through a trailer control connection 36 and a trailer supply connection 38. The trailer supply connection 38 is pneumatically connected to the reservoirs 48 on the tractor. The trailer control connection 36 is pneumatically connected to the trailer pressure control device 34. The trailer pressure control device 34 receives a brake control signal from an output of the braking system controller 22 and converts the brake control signal to a control air signal for the trailer. With this tractor-trailer braking system configuration, the braking system controller 22 of the tractor air brake system is able to control the control air signal supplied to the trailer brake system through the trailer pressure control device 34 and actuate the trailer brake independently of the operator in order to maintain vehicle stability.

The braking system controller 22 also receives a signal, or signals, from stability sensors on the tractor. Each of the at least four wheel speed sensors 44 communicates the individual wheel speeds to the braking system controller 22 for use in antilock braking system (ABS), automatic slip regulation (ASR) and electronic stability control (ESC) algorithms. A yaw rate signal and a lateral acceleration signal from a yaw rate sensor 26 and lateral acceleration sensor 27, respectively, are used in ESC algorithms. The yaw rate sensor 26 and the lateral acceleration sensor 27 are mounted on the tractor and may be discrete or packaged as a combination sensor, such as the Bendix® YAS-60™ sensor. The yaw rate sensor 26 and lateral acceleration sensor 27 may communicate directly with an input at the braking system controller 22 or over the vehicle serial communication bus. Other stability sensors, including the steering angle sensor 46, may be used. The braking system controller 22 is able to use at least the stability signals to determine the stability condition of the tractor and trailer and to enhance the braking response when the operator actuates the brakes, as in ABS control, or independently of the operator actuating the brakes, as in ASR or ESC control.

The braking system controller 22 transmits the brake control signal via the outputs to the right front modulator 52, left front modulator 54, right rear modulator 56, left rear modulator 58, front traction relay valves 40, rear traction relay valve 41, and trailer pressure control device 34 to apply the tractor and/or trailer brakes when executing ABS, ASR or ESC control. If a fault occurs during the automated braking, the braking system controller 22 is capable of transmitting a diagnostic error code or turning on a diagnostic lamp (not shown), either through a dedicated output or over the serial communication bus. The diagnostic output can also indicate the state of the brake control signal.

The tractor may be equipped with an automatic cruise control (ACC) system, such as Bendix® Wingman® adaptive cruise with braking In such configurations, the braking system controller 22 also receives information from a radar sensor 30 when the ACC system is activated by the operator. The radar sensor 30 is mounted on the tractor. The information from the radar sensor 30 is received directly through an input on the braking system controller 22 or over the vehicle serial communication bus. The information transmitted by the radar sensor 30 typically includes automated deceleration requests. An automated deceleration request is created when the ACC system determines the tractor needs to decelerate in order to maintain a certain following distance between the tractor and a target vehicle. The braking system controller 22 responds to an automated deceleration request by dethrottling the engine, activating a vehicle retarder or transmitting brake control signals to the individual modulators 52, 54, 56, 58, traction relay valves 40, 41 and the trailer pressure control device 34. If the vehicle is equipped with Collision Mitigation Technology (CMT), such as Bendix® Wingman® Advanced™ system, the braking system controller 22 is continuously receiving and responding to information from the radar sensor 30. The braking system controller 22 first alerts the operator of a reduced distance between the tractor and the target object and then transmits the brake control signals to slow the vehicle. During automated braking initiated by a deceleration request from the ACC or CMT system, all of the modulators 52, 54, 56, 58 and the trailer pressure control device 34 are typically actuated simultaneously by the braking system controller 22 to achieve the same braking pressure at each wheel end.

The braking system controller 22 includes a processing and memory unit 23 that executes and persistently stores computer-executable instructions for performing the various methods, functions, protocols, procedures, etc., described herein. The processing and memory unit 23 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processing unit. The processing and memory unit 23 includes control logic for determining whether the tractor is being pulled out of the desired travel path. During automated braking initiated by a deceleration request from the ACC or CMT system, the control logic is capable of determining vehicle pull due to a single faulted wheel end modulator. Additionally, "control logic," as used herein denotes a set of computer-executable instructions (e.g., a routine, subroutine, program, application, or the like) that is persistently stored on the computer-readable medium or memory and executed by the processing unit to perform the various methods, techniques, functions, etc., described herein.

The automated deceleration request is received by the braking system controller 22. The control logic of the braking system controller 22 enables algorithms 70 and 100 (FIGS. 2, 3) when a deceleration request of less than zero but greater than or equal to a deceleration threshold is received. The deceleration threshold is about −2 m/s^2. The lower braking pressures implemented by deceleration requests greater than −2 m/s^2 improve the confidence in the vehicle pull algorithm results. For example a deceleration request of approximately −1.2 m/s^2 allows the algorithm to be enabled, but a deceleration request of approximately −2.2 m/s^2 will not allow the algorithm to be enabled. The braking system controller 22 will transmit brake control signals if the braking system controller 22 determines that braking is necessary for the vehicle to keep a predetermined following distance from the target vehicle or to mitigate an impending collision. A deceleration request lower than the deceleration threshold will not enable the algorithms 70, 100, although automated braking will continue as determined by the braking system controller 22. If the operator actuates the brakes, the algorithms 70, 100 will not be enabled.

Figure 2:
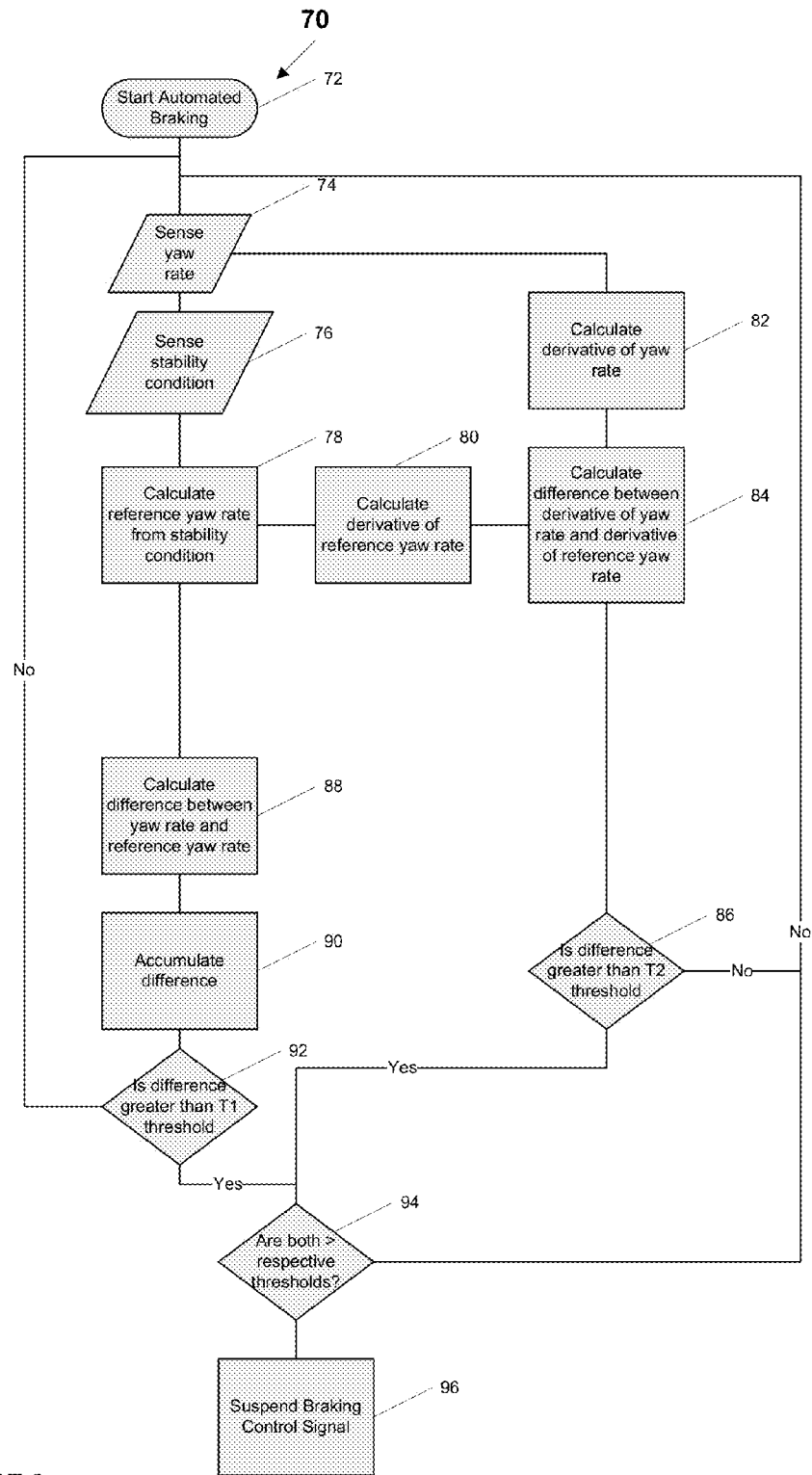
FIG. 2 illustrates a flowchart describing a method for detecting and responding to vehicle pull, according to an embodiment of the present invention.

A flowchart for implementing an algorithm 70 of the present invention is shown in FIG. 2. After the deceleration request is received by the braking system controller 22 and the controller 22 determines that an automated brake application will be used to decelerate the vehicle, the automated braking begins in step 72. While the automated braking is engaged, a yaw rate signal indicative of the yaw rate of the tractor is sensed at step 74.

While the automated braking is engaged, a stability signal from a sensor on the tractor is sensed in step 76. The stability signal, one or more of the following variables, including but not limited to, the steering angle of the tractor, the lateral acceleration of the tractor, the wheel speed of the tractor, or a combination of each of these, is used to calculate a reference yaw rate in step 78. The reference yaw rate is calculated empirically using a vehicle dynamics model based on fundamental vehicle dynamics principles that combines the steering angle signal, the vehicle speed, vehicle characteristics, including but not limited to, wheelbase, steady-state understeer gradient, and vehicle dynamic response lag time. The stability condition of the tractor is determined by comparing the yaw rate signal with the reference yaw rate.

The difference between the yaw rate signal and the reference yaw rate is calculated in step 88. The difference between the yaw rate signal and the reference yaw rate is accumulated in step 90 by adding the absolute value of the difference between the reference yaw rate and the yaw rate signal to a previously determined accumulated difference during the execution of the algorithm 70. In this manner, the accumulated difference as determined in step 90 increases each time the algorithm calculates a non-zero difference in step 88. For example, if difference between the yaw rate signal and the reference yaw rate is 0.0002 during a first calculation and 0.0001 during a second calculation, the accumulated difference calculated in step 90 is 0.0003, the sum of the differences. The accumulated difference is compared to a predetermined yaw differential threshold in step 92. If the accumulated difference is less than or equal to the predetermined yaw differential threshold, a first predetermined threshold T1, the algorithm returns to step 74. If the accumulated difference is greater than the first predetermined threshold T1, the algorithm continues to step 94. In one embodiment the threshold T1 ranges from about 0.005 rad/s to about 0.5 rad/s, in another embodiment, from about 0.035 rad/s to about 0.065 rad/s and in another embodiment the threshold T1 is about 0.05 rad/s.

A derivative of the reference yaw rate is calculated in step 80 using known methods. A derivative of the yaw rate signal is calculated in step 82 using known methods. The difference between the derivative of the yaw rate signal and the derivative reference yaw rate is calculated in step 84. The difference between the derivative of the yaw rate signal and the derivative of the reference yaw rate is compared to a predetermined derivative threshold, a second predetermined threshold T2, in step 86. If the difference is less than or equal to the second predetermined threshold T2, the algorithm 70 returns to step 74. If the difference is greater than the second predetermined threshold T2, the algorithm 70 continues to step 94. In one embodiment the threshold T2 ranges from about 0.0025 rad/s/s to about 0.25 rad/s/s, in another embodiment, from about 0.0175 rad/s/s to about 0.0325 rad/s/s and in another embodiment, the threshold T2 is about 0.025 rad/s/s.

In step 94, if both the accumulated difference as calculated in step 90 and the difference of the derivatives as calculated in step 84 are less than or equal to their respective predetermined thresholds T1 and T2, then the algorithm 70 returns to step 74. If both the accumulated difference as calculated in step 90 is greater than T1 and the difference of the derivatives as calculated in step 84 is greater than T2, then the brake control signal initiated when automated braking was begun is suspended in step 96. The algorithm 70 has thus determined that a possible vehicle pull is occurring at one of the wheel ends while the automated braking is engaged. The control logic can then intervene by suspending the brake control signal based on the occurrence of vehicle pull.

Accordingly, a controller for a vehicle braking system comprises a yaw rate input for receiving a yaw rate signal indicative of a yaw rate of the vehicle; a stability input for receiving a stability signal from a sensor of the vehicle; and a deceleration input for receiving a deceleration signal indicative of an automated deceleration request. The controller also comprises a brake output for transmitting a brake control signal. The controller also comprises control logic capable of transmitting the brake control signal in response to the deceleration signal; and based on the yaw rate signal and the stability signal, determining that a vehicle pull is occurring during the transmission of the brake control signal.

Accordingly, a method for detecting vehicle pull during automated braking comprises receiving a deceleration signal; initiating automated braking in response to the deceleration signal; receiving a signal indicative of a yaw rate of the vehicle; receiving a stability signal from a sensor of the vehicle; determining a reference yaw rate of the vehicle based on the stability signal; determining a vehicle pull is occurring during automated braking based on the reference yaw rate and the yaw rate signal. Automated braking can be disabled by the control logic automated braking when both the accumulated yaw rate differential is greater than the first predetermined threshold and the derivative differential is greater than the second predetermined threshold.

Figure 3:
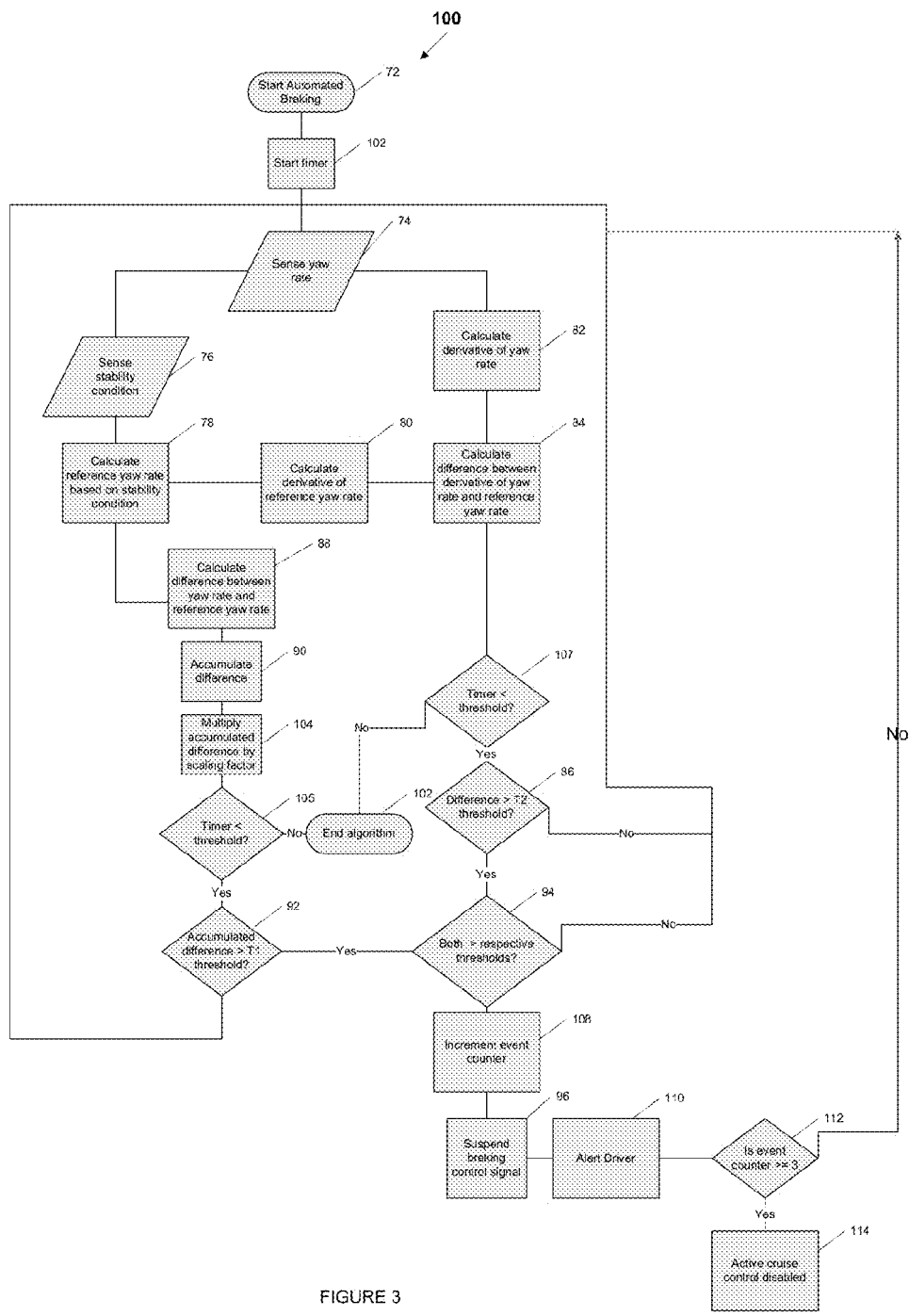
FIG. 3 illustrates a flowchart describing a method for detecting and responding to vehicle pull, according to an embodiment of the present invention.

FIG. 3 shows a flowchart for implementing additional methods for determining vehicle pull and terminating automated braking, according to alternative embodiments of the present invention. In one embodiment, control algorithm 100 is used to determine whether to terminate automated braking and incorporates some of the same steps as the embodiment described above with respect to FIG. 2.

After the deceleration request is received by the braking system controller 22 and the braking system controller 22 determines that an automated brake application will be used to decelerate the vehicle, the automated braking begins in step 72. A timer is initiated at step 102. While the automated braking is engaged, a yaw rate signal indicative of the yaw rate of the tractor is sensed at step 74.

A stability signal from a sensor on the tractor is sensed in step 76. The stability signal includes one or more variables, but is not limited to, the steering angle of the tractor, the lateral acceleration of the tractor, the wheel speed of the tractor, or a combination of each of these. The stability signal is used to calculate a reference yaw rate in step 78. The reference yaw rate is calculated empirically using a vehicle dynamics model based on fundamental vehicle dynamics principles that combines the steering angle signal, the vehicle speed, vehicle characteristics, including but not limited to, wheelbase, steady-state understeer gradient, and vehicle dynamic response lag time. The stability condition of the tractor is determined by comparing the yaw rate signal with the reference yaw rate.

The difference between the yaw rate signal and the reference yaw rate is calculated in step 88. The difference between the yaw rate signal and the reference yaw rate is accumulated in step 90 by adding the absolute value of the difference between the reference yaw rate and the yaw rate signal to a previously determined accumulated difference during the execution of the algorithm 100. In this manner, the accumulated difference as determined in step 90 increases each time the algorithm calculates a non-zero difference in step 88.

The accumulated difference is multiplied by a scaling factor in step 104 to achieve a scaled accumulated difference. The scaling factor is determined in the control logic of the braking system controller 22 using factors such as the mu-split variable. For example, the scaling factor is approximately 1 if the mu-split variable is 0 and approximately 0.05 if the mu-split variable is 1. Therefore, a false detection of vehicle pull is less likely to occur if the vehicle is on a split coefficient surface with a high mu-split variable because the scaled accumulated difference will be less than the non-scaled accumulated difference.

The timer is monitored in step 105. If the timer is equal to or exceeds a time threshold, the algorithm 100 is discontinued in step 102. The time threshold ranges between at least about one second up to about two seconds from the start of automated braking. The time threshold is selected so that the vehicle pull algorithm is active during the beginning of the automated braking to improve detection of vehicle pull. If the timer is less than the time threshold, the accumulated difference is compared to a predetermined threshold T1 in step 92. If the accumulated difference is less than or equal to the predetermined threshold T1, the algorithm 100 returns to step 74. If the accumulated difference is greater than the predetermined threshold T1, the algorithm 100 continues to step 94. In one embodiment the threshold T1 ranges from about 0.005 rad/s to about 0.5 rad/s, in another embodiment, from about 0.035 rad/s to about 0.065 rad/s and in another embodiment the threshold T1 is about 0.05 rad/s.

A derivative of the reference yaw rate is calculated in step 80 using known methods. A derivative of the yaw rate signal is calculated in step 82 using known methods. The difference between the derivative of the actual yaw rate and the derivative reference yaw rate, a derivative difference, is calculated in step 84. The timer is monitored is step 107. If the timer is equal to or exceeds the time threshold, the algorithm 100 is discontinued in step 102. In one embodiment, the time threshold is greater than one second but less than or equal to two seconds from the start of automated braking. If the time threshold is not exceeded by the timer, the difference between the derivative of the actual yaw rate and the derivative of the reference yaw rate is compared to the predetermined threshold T2 in step 86. If the difference is less than or equal to the predetermined threshold T2, the algorithm returns to step 74. If the difference is greater than the predetermined threshold T2, the algorithm continues to step 94. In one embodiment the threshold T2 ranges from about 0.0025 rad/s/s to about 0.25 rad/s/s, in another embodiment, from about 0.0175 rad/s/s to about 0.0325 rad/s/s and in another embodiment, the threshold T2 is about 0.025 rad/s/s.

In step 94, if both the scaled accumulated difference as calculated in step 104 and the difference of the derivatives as calculated in step 84 are less than or equal to their respective predetermined thresholds T1 and T2, then the algorithm returns to step 74. In step 94, if both the scaled accumulated difference as calculated in step 104 and the difference of the derivatives as calculated in step 84 are greater than their respective predetermined thresholds, T1 and T2, then an event counter is incremented by 1 in step 108. The brake control signal initiated by the deceleration request is suspended in step 96 because the algorithm 100 has determined a vehicle pull is occurring at one of the wheel ends while the automated braking is engaged.

The driver may be alerted of the suspension of the brake control signal in step 110 via a lamp or diagnostic code through the diagnostic output of the braking system controller 22. If the event counter is less than three (3) as determined in step 112, the algorithm 100 returns to step 74. If the event counter is greater than or equal to three (3) as determined in step 112, active cruise control is disabled in step 114 such that the brake system controller 22 will no longer respond to deceleration requests from the ACC system since the vehicle pull has continued to be detected.

Accordingly, a controller for a vehicle braking system comprises a yaw rate input for receiving a yaw rate signal indicative of a yaw rate of the vehicle; a stability input for receiving a stability signal from a sensor of the vehicle; a deceleration input for receiving a deceleration signal indicative of an automated deceleration request. The controller includes a brake output for transmitting a brake control signal. The controller includes control logic capable of: transmitting the brake control signal in response to the deceleration signal; and determining a vehicle pull situation is occurring, during the transmission of the brake control signal, based on the stability signal and the yaw rate signal. The control logic is capable of determining a reference yaw rate based on the stability signal; determining a difference between the reference yaw rate and the yaw rate signal; accumulating the difference between the reference yaw rate and the yaw rate signal; comparing the accumulated difference to a first predetermined threshold; determining a derivative of the yaw rate signal; determining a derivative of the reference yaw rate; and comparing the difference between the derivative yaw rate signal and the derivative reference yaw rate to a second predetermined threshold. The accumulated yaw rate differential is determined by adding the difference between the yaw rate signal and reference yaw rate over a predetermined period of time. The accumulated difference is multiplied by a scaling factor based on the mu-split variable prior to being compared to the first predetermined threshold.

The controller includes a brake output for transmitting a brake control signal. The control logic can suspend the transmission of the brake control signal based on whether a vehicle pull is occurring. The controller further comprises a diagnostic output for informing an operator of the state of the brake control signal.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for a vehicle braking system of a vehicle comprising:
    a yaw rate input for receiving a yaw rate signal indicative of a yaw rate of the vehicle;
    a stability input for receiving a stability signal from a sensor of the vehicle;
    a deceleration input for receiving a deceleration signal indicative of an automated deceleration request;
    a brake output for transmitting a brake control signal; and
    control logic capable of:
        transmitting the brake control signal in response to the deceleration signal; and
        determining a vehicle pull is occurring during the transmission of the brake control signal based on the stability signal and the yaw rate signal.

2. The controller as in claim 1, wherein the control logic is further capable of suspending the transmission of the brake control signal based on the occurrence of vehicle pull.

3. The controller as in claim 1, wherein the stability signal comprises at least one of a steering angle signal, a wheel speed signal and a lateral acceleration signal.

4. The controller as in claim 1, wherein the stability signal comprises a steering angle signal.

5. The controller as in claim 1, wherein determining a vehicle pull is occurring comprises:

determining a reference yaw rate based on the stability signal;

determining a difference between the reference yaw rate and the yaw rate signal;

determining an accumulated difference based on the difference between the reference yaw rate and the yaw rate signal;

comparing the accumulated difference to a first predetermined threshold;

determining a derivative of the yaw rate signal;

determining a derivative of the reference yaw rate;

determining a derivative difference based on the difference between the derivative of the yaw rate signal and the derivative of the reference yaw rate; and comparing the derivative difference to a second predetermined threshold.

6. The controller as in claim 5 wherein the control logic is further capable of suspending transmission of the brake control signal in response to the accumulated difference being greater than the first predetermined threshold and the derivative difference being greater than the second predetermined threshold.

7. The controller as in claim 5, wherein the first predetermined threshold ranges from about 0.035 rad/s to about 0.065 rad/s and the second predetermined threshold ranges from about 0.0175 rad/s/s to about 0.0325 rad/s/s.

8. The controller as in claim 5, wherein the first predetermined threshold is about 0.05 rad/s and the second predetermined threshold is about 0.025 rad/s/s.

9. The controller as in claim 5, wherein the accumulated difference is multiplied by a scaling factor based on a mu-split variable prior to being compared to the first predetermined threshold.

10. The controller as in claim 1, further comprising a diagnostic output for indicating the state of the brake control signal.

11. The controller as in claim 1, further comprising a timer, and wherein the control logic is further capable of discontinuing the determination of vehicle pull in response to the timer being at least as great as a time threshold.

12. The controller as in claim 11, wherein the time threshold ranges from at least one second to about two seconds from the start of the transmission of the brake control signal.

13. A controller for determining vehicle pull of a vehicle comprising:

a yaw rate input for receiving a yaw rate signal;

a stability input for receiving a stability signal from a vehicle sensor;

a deceleration input for receiving a deceleration signal;

a brake control output for transmitting a brake control signal in response to the deceleration signal;

means for determining a vehicle pull is occurring during the transmission of the brake control signal, wherein the vehicle pull determination is based on the stability signal and the yaw rate signal;

means for determining an accumulated difference;

means for determining a derivative difference; and means for suspending the transmission of the brake control signal based on the accumulated difference being greater than a first predetermined threshold and the derivative difference being greater than a second predetermined threshold.

14. The controller as in claim 13, wherein the stability signal comprises at least one of a steering angle signal, a wheel speed signal and a lateral acceleration signal.

15. The controller as in claim 13, wherein the first predetermined threshold ranges from about 0.035 rad/s to about 0.065 rad/s and the second predetermined threshold ranges from about 0.0175 rad/s/s to about 0.0325 rad/s/s.

16. A controller for a vehicle braking system of a vehicle comprising:

a yaw rate input that receives a yaw rate signal indicative of a yaw rate of the vehicle;

a stability input that receives a stability signal from a sensor of the vehicle;

a deceleration input that receives a deceleration signal indicative of an automated deceleration request;

a brake output that transmits a brake control signal; and control logic, wherein the control logic:

receives a deceleration signal;

initiates automated braking in response to the deceleration signal;

determines a reference yaw rate of the vehicle based on the stability signal; and determines a vehicle pull is occurring during automated braking based on the reference yaw rate and the yaw rate signal.

17. A method for detecting vehicle pull during automated braking of a vehicle comprising:

receiving a deceleration signal;

initiating automated braking in response to the deceleration signal;

receiving a signal indicative of a yaw rate of the vehicle;

receiving a stability signal from a sensor of the vehicle;

determining a reference yaw rate of the vehicle based on the stability signal;

determining a vehicle pull is occurring during automated braking based on the reference yaw rate and the yaw rate signal.

18. The method as in claim 17, further comprising suspending automated braking based on the occurrence of vehicle pull.

19. The method as in claim 17, further comprising:

determining an accumulated difference;

determining a derivative difference;

comparing the accumulated difference to a first predetermined threshold;

comparing the derivative difference to a second predetermined threshold; and suspending automated braking in response to the accumulated difference exceeding a first predetermined threshold and the derivative difference exceeding a second predetermined threshold.

20. The method as in claim 19, wherein the first predetermined threshold ranges from about 0.035 rad/s to about 0.065 rad/s and the second predetermined threshold ranges from about 0.0175 rad/s/s to about 0.0325 rad/s/s.

21. The method as in claim 19, wherein the first predetermined threshold is about 0.05 rad/s and the second predetermined threshold is about 0.025 rad/s/s.

22. The method as in claim 17 wherein the vehicle pull is determined until a timer is at least as great as a time threshold.

23. The method as in claim 22, wherein the time threshold is at least one second but less than or equal to two seconds from the initiation of automated braking.

24. The method as in claim 17, wherein the stability signal comprises at least one of a steering angle signal, a wheel speed signal and a lateral acceleration signal.

25. The method as in claim 17, wherein the stability signal comprises a steering angle signal.

* * * * *